July 10, 1956
W. H. HOWE ET AL
2,754,053
COMPUTING SYSTEM
Filed Feb. 23, 1951
6 Sheets-Sheet 1
FIG. I
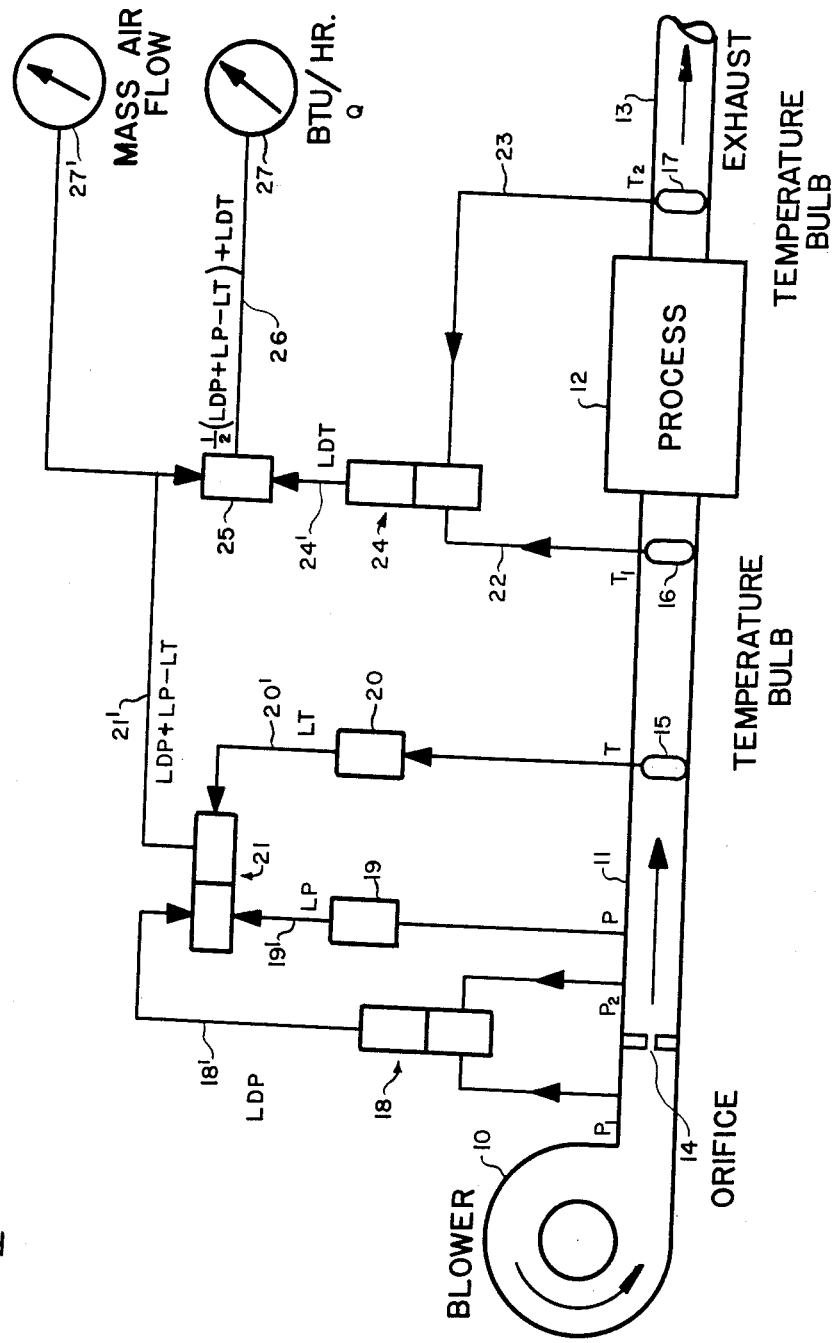
INVENTOR.
WILFRED H. HOWE
BY WILLIAM E. VANNAH
Curtis, Morris + Safford
ATTORNEYS

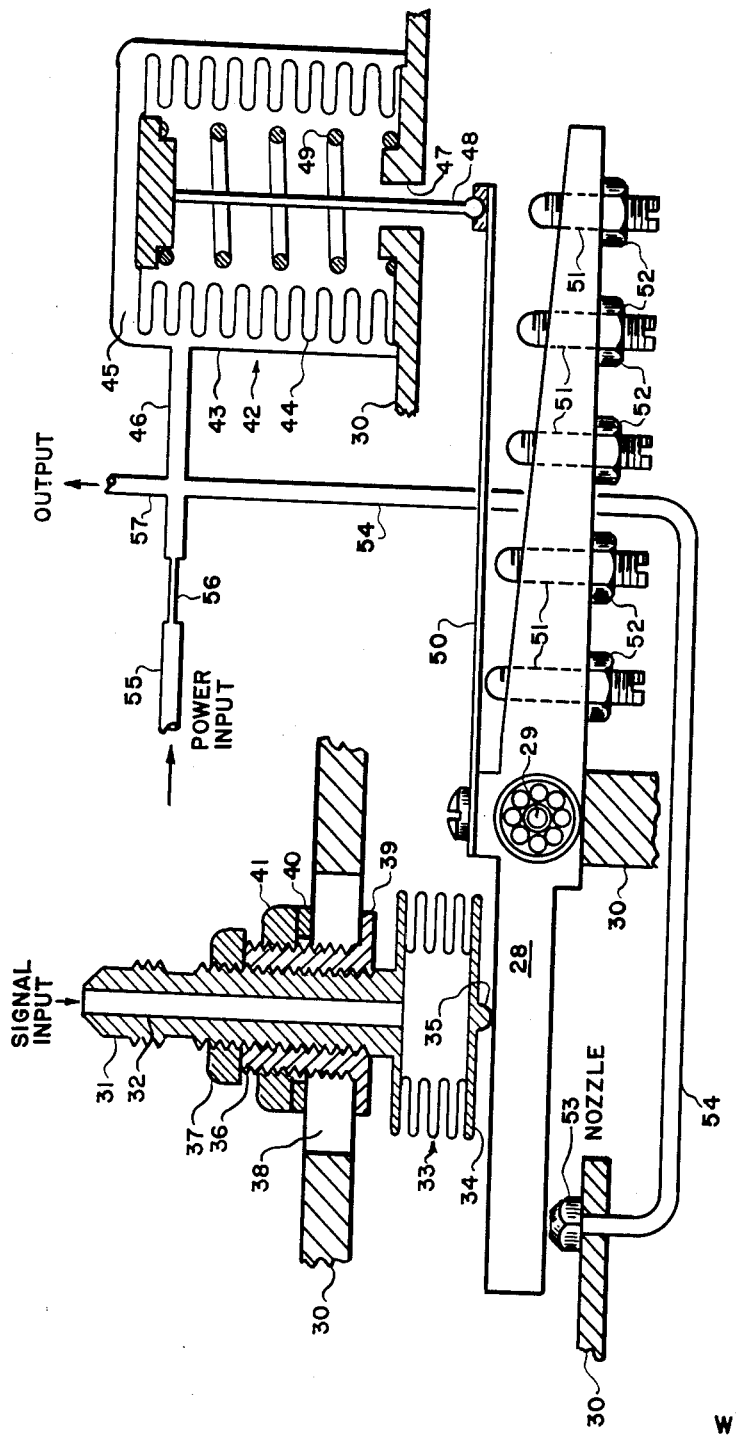
FIG. II

July 10, 1956 W. H. HOWE ET AL 2,754,053
COMPUTING SYSTEM
Filed Feb. 23, 1951 6 Sheets-Sheet 3
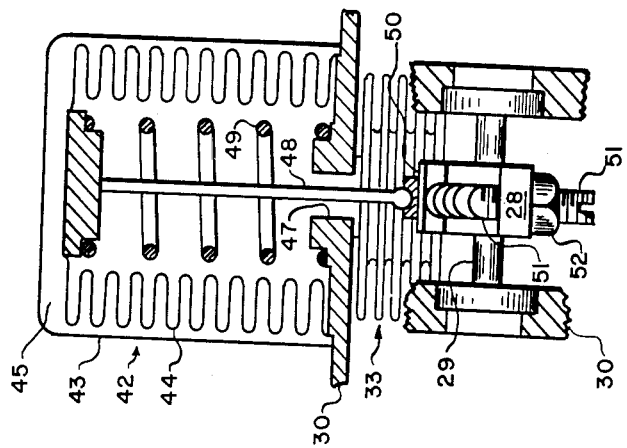
FIG. IV
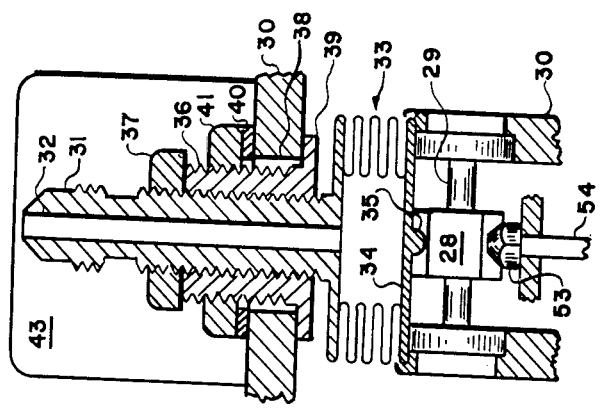
FIG. III
INVENTOR.
WILFRED H. HOWE
BY WILLIAM E. VANNAH
Curtis, Morris + Safford
ATTORNEYS

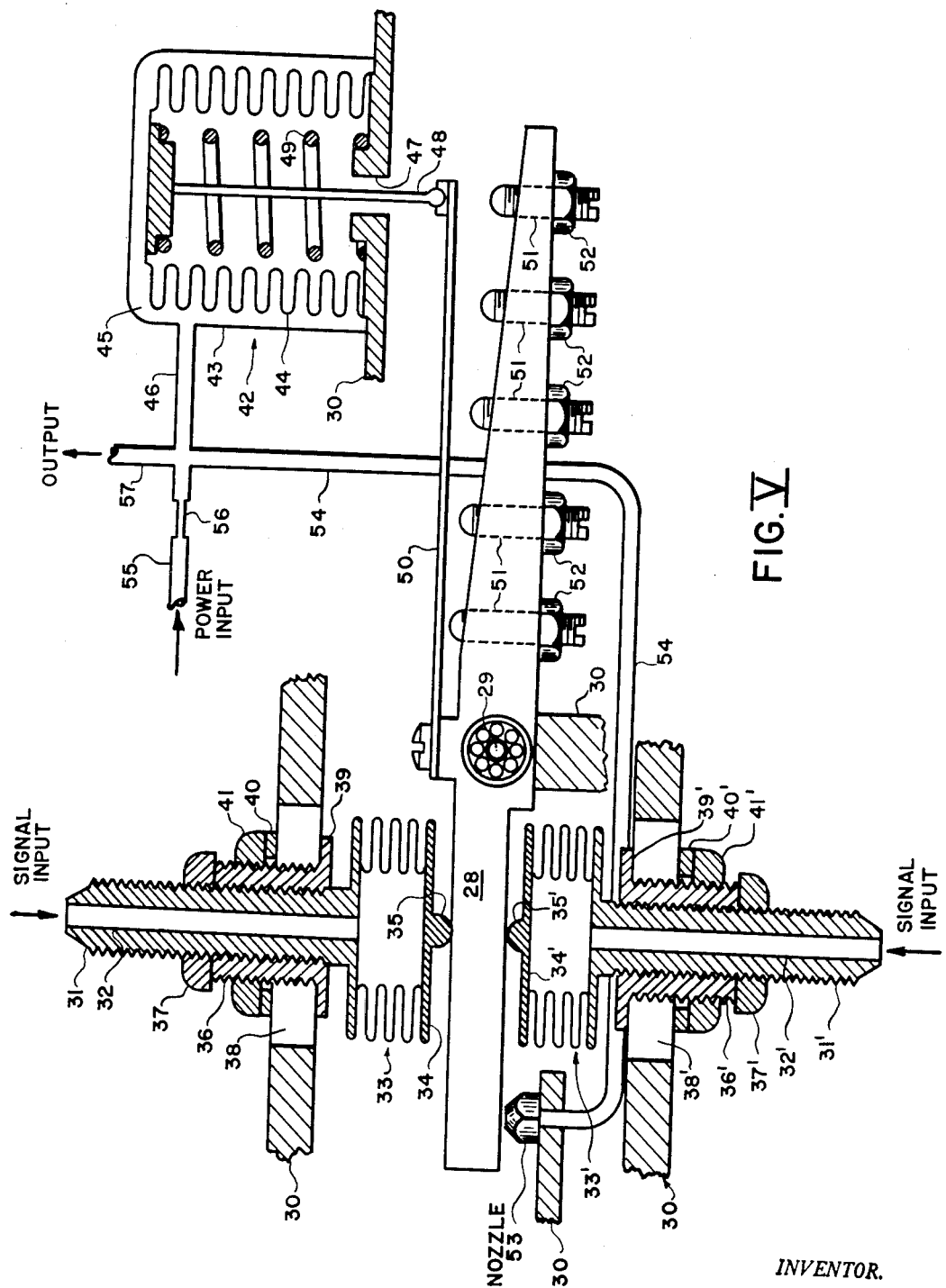

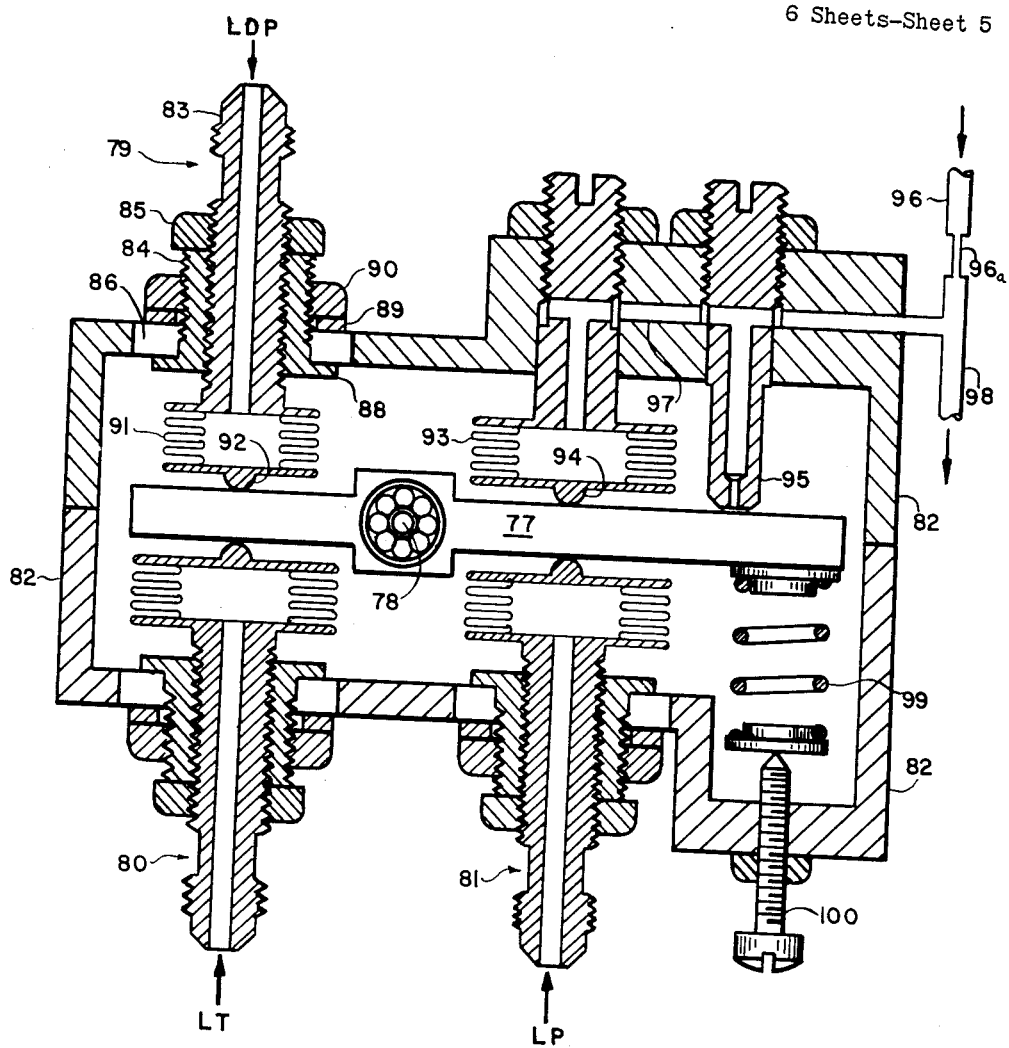
FIG. VI
INVENTOR.
WILFRED H. HOWE
BY WILLIAM E. VANNAH

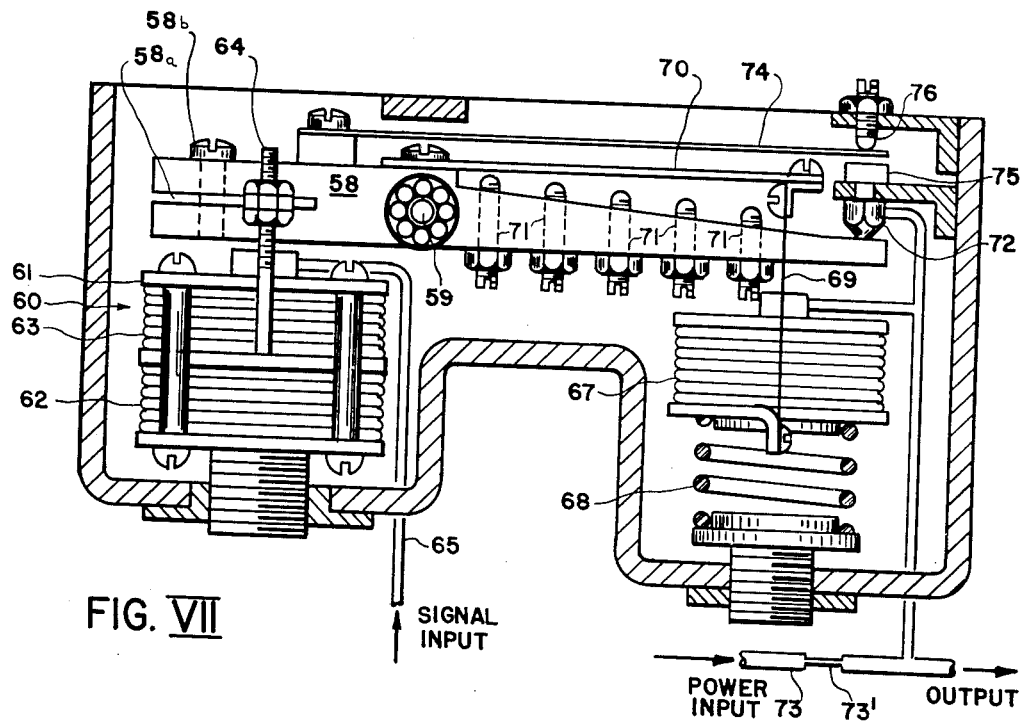
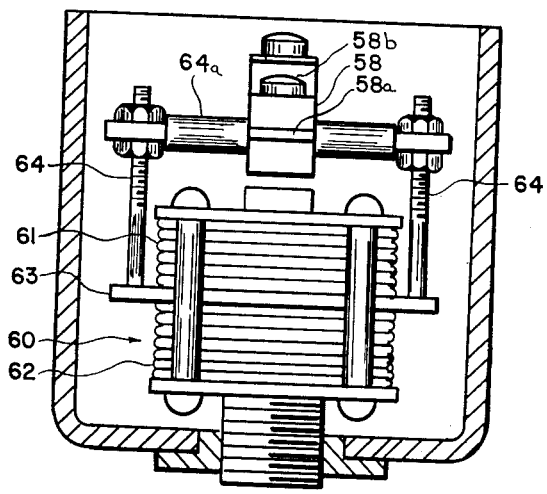
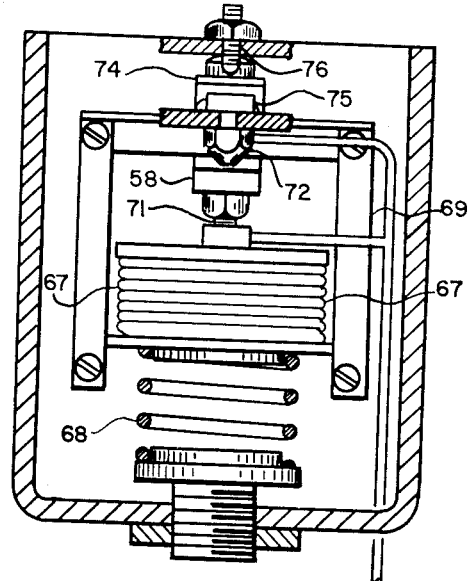

United States Patent Office 2,754,053
Patented July 10, 1956

2,754,053
COMPUTING SYSTEM

Wilfred H. Howe, Sharon, and William E. Vannah, Foxboro, Mass., assignors to The Foxboro Company, Foxboro, Mass., a corporation of Massachusetts Application February 23, 1951, Serial No. 212,268

4 Claims. (Cl. 235—61)

This invention relates to computing systems, with particular reference to computer units and their arrangement in such systems, and includes a computing method as associated with such systems and units.

It is an object of this invention to provide new and improved computer systems, arrangements, and units, and a method associated therewith.

Other objects and advantages of this invention will be in part obvious and in part pointed out hereinafter. These objects and advantages are attained by the novel methods and apparatus described in the following specification, and they may be more readily understood by reference to the accompanying drawings.

The application of this invention is general, that is, the computing system may be electrical, mechanical, hydraulic, pneumatic, or any combination thereof; and any process or variable condition, or combinations thereof, may be subject to the chosen system. Examples of such conditions are flow, pressure, and temperature. The final result may be an indication, a record, a control, or any combination thereof.

Referring to the drawings:

Figure I is a schematic illustration of an application of a system of this invention to a process;

Figure II is an illustration of a translation or characterizing unit of this invention;

Figure III is a left-end elevation of the structure of Figure II;

Figure IV is a right-end elevation of the structure of Figure II;

Figure V is an illustration of an alternative structure for that of Figure II;

Figure VI is an illustration of a combining or totalling unit of this invention;

Figure VII is an illustration of another alternative structure for that of Figure II;

Figure VIII is a left-end elevation of the structure of Figure VII; and

Figure IX is a right-end elevation of the structure of Figure VII.

Specifically disclosed herein as an illustrative application of this invention to a device for air cooling a process, is a pneumatic computing system resolving independent variables of temperature and pressure to an indication of the heat absorption from the process.

In this invention, characterized functions of independent variables are taken with functional bases of characterization, for example, logarithmic bases, chosen to give convenient ranges of output corresponding to the working ranges of the independent variables, and these outputs are combined in a ratioing system which compensates for difference in the chosen functional bases of characterization.

Reference is made herein to "translation" units and "characterization." The translation units accomplish the characterization, that is, for example, the changing of a particular pneumatic pressure variation to a related pneumatic pressure variation. This invention includes means for obtaining a wide variety of characterizations, including arbitrary functions. In the illustrations given herein, the characterization translates a pneumatic pressure linear variation in pneumatic pressure to a logarithmic variation in pneumatic pressure.

The computing system

Referring to Figure I, at the lower left, blower 10 is shown. An air stream from the blower 10 is conducted through a pipe 11 to a process unit 12. The air stream passes through the process unit, absorbing heat from the process, and is exhausted through a pipe 13. When the amount of heat removed is an important factor in the process, it is essential that the amount of heat so absorbed be accurately determined.

It is necessary, in practical operation, to determine this heat value automatically and there are a number of independent variables which must be combined. These variables are sensed at different points along the air stream by means of usual and common pneumatic pressure producing sensing elements. In the pipe 11, at the left, there is shown an orifice plate 14 which creates a differential pressure representative of the rate of flow of the air. Before and after the orifice plate 14, at $P_1$ and $P_2$, pressure taps are established. How the differential pressure $(P_1 - P_2 = DP)$ is determined will be explained later herein. To the right of $P_1$ and $P_2$, at $P$, another pressure tap is established, this to obtain static pressure, as a factor in the computation. Further to the right along the pipe 11, at $T$, is a temperature element 15 for providing a proportional pressure to be used as a factor in the computation. Finally, before and after the process unit 12, at $T_1$ in the pipe 11 and at $T_2$ in the pipe 13, temperature sensing elements 16 and 17 are established to provide temperature representative pressures from which a differential pressure representative of the temperature differential across the process, may be obtained. The theory of operation of the system herein given as an illustration of this invention is explained immediately hereafter, and this is followed by an explanation of the structure involved in the illustration and its relation to the theory.

The following equation expresses the quantity of heat absorbed in terms of these pressures and temperatures:

$$Q = \sqrt{\frac{DP \times P}{T}} \times DT \times K$$

where $Q$ = quantity of heat absorbed
$DP$ = differential pressure (across the orifice 14)
$P$ = absolute static pressure
$T$ = absolute temperature
$DT$ = differential temperature (across process 12)
$K$ = calibration constant In the actual structure of this illustration of this invention, the quantity of heat ($Q$) may be automatically derived from the above listed independent variables. This is done by using interconnected translation and combining units as illustrated in Figure I by the various rectangular blocks and their connecting lines, above the pipe 11, whose detailed structure and operation will be described hereinafter. Since the combining units, as will be explained, are incapable of multiplying or dividing two variables, the above equation must be changed to eliminate the multiplications and divisions. This is done by converting the equation to its logarithmic form where addition and subtraction replace multiplication and division. The equation then becomes:

Log $Q = \frac{1}{2}$ log $DP + \frac{1}{2}$ log $P - \frac{1}{2}$ log $T +$ log $DT$ A point which must be considered is the base to which each logarithm is taken. In the translation units, in order to operate the system using customary operating pressure ranges, a choice is made of a convenient and suitable output range for the particular translation unit and the logarithmic base is thereby established. Since the working range of the variable is fixed by the process, the logarithmic base is determined by the choice of the output range, although both the working range and the output range are factors in the base determination. These output ranges may be the same, but are most likely to be different in different translation units. Thus the logarithmic bases of the respective translation units are those that necessarily result from the particular chosen output range involved.

From the preceding paragraph it will be seen that the logarithmic outputs of several translation units may be brought to a combining unit with different logarithmic bases. Unless the logarithmic bases are the same, totalling of the logarithmic values is not equivalent to multiplication or division of the principal values. Therefore, in the combining units, constants are applied to provide a common logarithmic base for the logarithmic values. In the combining units, also, the output range is chosen for convenience, and here again the logarithmic base necessarily results from this choice.

Such control of the output ranges leads to the final range desired at the output end of the system as a suitable and convenient pressure range for the operation of the usual indicating, recording, or controlling apparatus. For example, control valves in flow lines customarily operate on a pressure range of 3–15 p. s. i.

Referring again to Figure I, the system will be traced, using the above logarithm equation. From the differential pressure sensing points $P_1$ and $P_2$, pressure connections are made to a combining and translation unit 18 (note Figure V). In this unit the differential of $P_1$ and $P_2$ is determined and a logarithmic function taken of this differential with the logarithm base resulting from working range of the differential and the chosen output range of the unit.

Referring to the air pipe 11, another pressure connection is made from the static pressure point P to a translation unit 19 (note Figure II). In this unit a logarithmic function is taken of the static pressure value, with the logarithm base determined, as in the unit 18. In like manner the pressure from the temperature sensing element T is translated in a unit 20 (note Figure II).

At this point we have the values log DP, log P, and log T. The output ranges of the translation units 18, 19, and 20 may be, but are not necessarily the same, and simply convenient, in each case. Consequently, their logarithm bases are not necessarily the same.

We may now proceed to a combining unit 21. In order to permit multiplication and division by totalling of logarithm values, a common logarithm base is provided by introducing suitable constants. This constant is applied by making calculated ratio adjustments in the combining unit 21, to compensate for the difference or differences of the logarithm bases of the units 18, 19, and 20.

The first three elements of the equation are now combined in the combining unit 21 (note Figure VI), to which pressure connections 18', 19', and 20' are made from the translation units 18, 19, and 20. This combining unit is a totalling unit. That is, the pressures from translation units 18 and 19 are added, and the pressure from translation unit 20 subtracted, in accordance with the first three elements of the equation:

Log DP+log P−log T

Here again, the output range is a convenient range. Further, the logarithm base of the output of the combining unit 21 is the result of the working range of the input pressure and the chosen output range.

Returning once again to Figure I, pressure connections 22 and 23 are made from the differential temperature sensing elements 16 and 17 at points $T_1$ and $T_2$ respectively, to a combining and translation unit 24 (note Figure V). Unit 24 operates in the same manner as unit 18, that is, the differential of the temperature representative pressures is taken, and a logarithmic function taken of the differential, again with logarithmic base resulting from working range of the differential and the choice of a convenient output range for the unit 24.

To complete the tracing of the system, in accordance with the equation, the output of the combining unit 21 is combined with the output of the combining and translation unit 24. This unit is similar to that shown in Figure VI. For this purpose, pressure connections 21' and 24' are made from these units to a final combining unit 25. In this unit, to follow the equation, in a manner to be explained later herein, the output of the unit 21 is combined with the output of the unit 24, with suitable constants applied to compensate for the difference, if any, in the logarithm bases of the outputs of the units 21 and 24.

The equation is now complete:

½ (log DP+log P−log T)+log DT=log Q and the output of the combining unit 25, with the final, initially chosen output range, is taken through a pressure connection 26 to a heat value indicator 27 calibrated, for example, in British thermal units.

As an aside, the equation for mass air flow in a system such as this:

$$Q_f = \sqrt{\frac{DP \times P}{T}}$$

or, logarithmically

Log $Q_f$=½ (log DP+log P−log T)

Since the summation in the above equation occurs as a pressure in Figure I, connection 21', an indicator 27' may be connected from connection 21' and calibrated in terms of mass air flow for example in pounds per hour.

The translation unit

This unit is illustrated in Figure II, and is represented in Figure I by units 19 and 20. This is a moment balance device, a form of pneumatic transmitter. It is referred to herein as a translation device because it may be adjusted to translate a linear pressure variation into a related logarithmic pressure variation.

This unit has, as a main operating part, a rigid arm 28 pivoted, with ball bearings, on a shaft 29. The shaft 29 is mounted on a portion of the housing 30. Opposing pressures are applied to the arm 28 to balance it on the pivot shaft 29. At the left and upper portion of the drawing, a variable condition pressure input member 31 is shown. A passage 32 extends through the member 31, opening into a bellows 33. The variable condition pressure thus is expressed in a tendency for the bellows to expand or contract. On the outer, free end face 34 of the bellows 33, is a contact button 35 for engagement with the pivot arm 28 at a point spaced from the pivot shaft 29. Thus the variable condition is expressed in a tendency to pivot the arm 28 in a counterclockwise direction or to varyingly limit its pivoting movement in a clockwise direction. The bellows 33 is secured to the input member 31, which is threaded into a mounting sleeve 36 which in turn is mounted on the unit housing 30. The input member 31 is secured to the mounting sleeve 36 by a lock nut 37. The entire assembly extends through a slot opening 38 in the housing 30, and the sleeve 36 is secured to the housing about this opening by the combination of an integral flange 39, a lock washer 40, and lock nut 41. The slot 38 is elongated in a direction approximately parallel to the pivot arm 28. The input assembly as a whole may thus be adjusted along the slot 38 to vary the moment relationship of the bellows 33 and the pivot shaft 29. The function of this adjustment will be explained hereinafter.

Referring again to Figure II, at the right, upper portion, a balancing pressure assembly 42 is shown. This assembly comprises a cuplike housing 43 with a bellows 44 mounted therein. The bellows housing 43 is mounted on a portion of the unit housing 30 so as to close off the mouth of the cup. The bellows 44 has one end secured to the unit housing 30 and a free inner end. This arrangement provides a pressure chamber 45 within the bellows housing 43 and outside of the bellows 44. A pressure connection 46 is provided through the housing 43 to the pressure chamber 45. Within the secured end area of the bellows 44, the unit housing 30 has an opening 47. Through this opening, a pressure rod 48 extends into the bellows 44, and is secured there to the free end of the bellows. Within the bellows 44, extending concentrically therewith, is a coil spring 49 for reducing the force to be applied by the pressure rod 48 to a suitable operating value. This spring has one end engaging the unit housing and the other engaging the inside face of the free end of the bellows 44. Thus the bellows is expanded or contracted according to the pneumatic pressure in the surrounding chamber 45 and the reaction of spring 49. Such action of the bellows moves the pressure rod 48 up and down. The pressure rod transmits its force to the pivot arm 28, in balancing opposition to the force from the variable condition bellows 33. This transmission is through a characterizing arrangement adjustable to be logarithmic, and discussed hereinafter as logarithmic for convenience in explanation.

This arrangement is embodied in the pivot arm 28 and comprises initially a flat spring arm 50, secured to the arm 28 adjacent the pivot shaft 29, which extends along, over, and in increasing spaced relation with the pivot arm on the balancing bellows side of that arm. For cooperation with the spring arm 50, and extending up through the pivot arm, a group of adjustable screws 51 is provided. These screws are mounted in a line of increasing separation from spring arm 50 in a direction away from pivot shaft 29 along the pivot arm 28 under the spring arm 50. The bellows pressure rod 48 engages the outer end of the spring 50 and as the bellows 44 is contracted, the spring 50 is flexed downwardly, engaging the upper ends of the screws 51 in succession, each time shortening the spring length and increasing the spring resistance to the force exerted by the rod 48. In this manner a characterized balance force is applied to the pivot arm 28. The variable condition pressure may be linear and with the screws 51 properly adjusted the balance pressure will be in logarithmic relation thereto. In order to change the characterization, the screws 51 may be adjusted and then secured by lock nuts 52.

At the left of the drawing a nozzle 53 is directed toward the lower face of the pivot arm 28 as a baffle. As the arm 28 is pivoted, the opening in the nozzle 53 is more or less covered. The nozzle is connected by pipe 54 to a constant pressure pneumatic power input 55 through a restrictor 56 in the customary manner of providing a small nozzle flow for nozzle-baffle arrangements. The nozzle pipe 54 is connected to the balance bellows input 46 and also to an output pipe 57.

The operation of the translator may start with an increase in variable condition pressure. The bellows 33 is expanded and the arm starts to pivot in counterclockwise direction, restricting the pneuamtic flow from the nozzle 53. This flow restriction causes pressure to build up in the balancing bellows chamber 45. Then this built up pressure is applied to the arm 28 through the logarithmic arrangement to balance the variable condition pressure.

This translation unit, therefore, has a logarithmic output. However, as previously discussed, the range of output is chosen for convenience, and the logarithm base is determined from this choice. That is, a base is arrived at which will result in the chosen output range. A logarithmic base change is accomplished by an adjustment of the assembly including the variable condition bellows 33 along the slot 38 previously described. This same adjustment is used for all characterizations and is not limited to logarithmic characterizations.

Referring to Figure V, there is illustrated a combining and translation unit as used in Figure I for the differential pressure and differential temperature units 18 and 24. This structure is identical with that of Figure II with the addition of a second variable input pressure assembly. This assembly is a duplicate of the variable input assembly of Figure II, and is applied to the pivot arm 28 in opposition to the comparable assembly of Figure II. The result is that it is the differential of two input pressures which tends to pivot the arm 28, rather than the single input pressure of Figure II. The theory and description as applied to Figure II applies fully to this structure, Figure V. The reference numerals in the added input assembly are related to those of the single input assembly of Figure II by a "prime" designation, with related numbers indicating duplicate parts.

Figures VII, VIII, and IX show a variation of the structure of Figure II. This structure is capable of being responsive to absolute pressures. A pivot arm 58 is mounted on a shaft 59. At the left of the drawing, a variable condition pressure bellows unit 60 is provided. This is made up of a variable pressure bellows 61 and an absolute pressure bellows 62 separated by a rigid dividing wall 63 which is movable upon variation of pressure in the bellows 61. The bellows dividing wall 63 is connected to the pivot arm 58 by bars 64, and the variable condition pressure is conducted to the bellows 61 through an input connection 65. For operating with small forces, flexible wires may be used in place of the bars 64. The bars 64 are connected to the pivot arm 58 by the insertion of a cross piece 64a, which joins the bars 64, in a slot 58a in the pivot arm 58. The cross piece 64a is clamped in the slot 58a by a lock screw 58b. Thus the moment of the bellows unit 60 with respect to the pivot shaft 59 may be varied by adjustment of the cross piece 64a in the slot 58a.

On the other side of the pivot arm 58, a balancing bellows 67 is provided, with a coil spring 68, and a link 69 in the form of a flexible strip, connecting the bellows and the characterizing spring 70. In the same arrangement as in Figure II, the characterizing spring 70 is secured to the pivot arm 58 and adjustment screws 71 are mounted in the pivot arm for cooperation with the characterizing spring. Further, a nozzle 72 is arranged in nozzle-baffle relation with the upper surface of the pivot arm acting as the baffle, a pneumatic power input connection 73 with a suitable restriction 73' is provided, and balancing bellows feedback and output pressure connections provided in the same manner as in Figure II. A flat bias spring 74 is secured at one end to the pivot arm 58, and its free end lies between a fixed stop 75 and an adjustable stop 76. This spring simply provides more adjustment and control of the pivot arm 58 with respect to the pressures applied thereto.

*The combining unit*

Figure VI illustrates this unit, which is utilized in Figure I as the combining unit 21. This is a moment balance pressure totalling unit in which a pivot arm 77 is balanced between the pressures to be added on the one hand, and the combination of a pressure to be subtracted and a balancing pressure, on the other. This is not a characterizing unit, but, as will be shown, it is a totalling unit with ratio adjustment to compensate for the difference in logarithmic bases in the various input pressure functions, as previously discussed herein in relation to the general operation of the computing system.

The pivot arm is mounted on a pivot shaft 78. Variable condition pressure input assemblies 79, 80, and 81 are mounted on the unit housing 82 and are identical with each other in design and with the input assembly of Figure II. Dimensions may be scaled suitably. These assemblies are adjustable on the housing in approximate parallelism with the pivot arm to vary the moment relations of the assemblies with respect to the pivot shaft 78 in the same manner as discussed herein in relation to the input assembly of Figure II. In this unit, Figure VI, these adjustments accomplish the ratio changes, i. e., the application of the necessary constants which are required to compensate for the difference in logarithmic bases of the input functions and also determine the output range which establishes the logarithmic base of the output of the unit, as previously discussed herein.

The input assembly 79 comprises a pressure input fitting 83, a mounting sleeve 84 within which the fitting 83 is threaded, and a lock nut 85 to secure the fitting and sleeve together. The entire assembly extends through a slot opening 86 in the unit housing 82 and is adjustably secured in the slot 86 between an integral flange 88 and a washer 89 held by a lock nut 90.

A bellows 91 has one end secured to the input fitting 83 with an opening to admit the variable condition pressure. The other end of the bellows is free to move with the varying pressure except as restrained by the engagement of its contact button 92 with the pivot arm 77. The other assemblies 80 and 81 have the same components and arrangements as the assembly 79.

Referring back to Figure I and the combining unit 21, according to the equation, the unit of Figure VI combines the elements:

$$\text{Log } DP + \log P - \log T$$

In Figure VI the assembly 79 may receive log DP, the assembly 81 may receive log P, and the assembly 80 may receive log T. Note that this arrangement adds log DP and log P and substracts log T by the direction of their applied pressures in respect to the pivoting of the arm 77.

In the unit of Figure VI a balancing pressure bellows 93 is provided with a contact button 94 for engagement with the pivot arm 77. The application of this balancing pressure creates a moment which aids the moment resulting from log T, and opposes the combination of moments caused by log DP and log P. A nozzle 95 is provided in the usual nozzle-baffle feed back relation with the pivot arm 77. A pressure connection 96 with a restriction 96a is provided to the nozzle 95 from a source (not shown) of constant pressure, a feed back pressure connection 97 is provided between the nozzle 95 and the balancing bellows 93, and an output connection 98 is provided from the balancing bellows 93. A biasing coil spring 99 is mounted in the unit housing 82, and bears on the pivot arm 77 as an aid in controlling and adjusting the opposing pressure applications in this unit. The spring 99 is adjustable to vary its applied pressure on the arm 77, through adjustment of a screw 100.

With reference to the translation and combining units generally, the bellows sizes and general moment relationships are designed into the units for a general scope of typical system problems, with the input assembly adjustments provided for the purposes hereinbefore explained final adjustments.

In summing up, in this invention, characterized functions of independent variables are taken with functional bases of characterization, for example, logarithmic bases resulting from a choice of convenient output ranges and the established working ranges of the independent variables, and these characterized functions are combined in a ratioing system which compensates for the difference in the functional bases of characterization. Further this invention provides translation units which are a characterized pneumatic transmitters with adjustments for changing the base functions of characterization.

Lastly, this invention provides combining units with adjustments to make the functional bases of characterization commensurate.

We claim:
1. For use in instruments of the character described, a torque balance nozzle-baffle translation unit comprising a pivoted arm, a variable condition responsive bellows for rotating said arm, a characterizingly responsive spring arrangement on said arm, a balancing pressure bellows for opposing the rotation of said arm through said spring arrangement, a power supplied back pressure nozzle operatively connected to said balancing pressure bellows and coverable upon rotation of said arm, and means for adjusting one of said bellows along said arm to change the moment relation between said condition responsive bellows and said balancing pressure bellows, with respect to said arm.

2. For use in instruments of the character described, a torque balance nozzle-baffle translation unit comprising a pivoted arm, a variable condition responsive bellows for rotating said arm, a modifying pressure bellows for opposing said condition responsive bellows, a characterizingly responsive spring arrangement on said arm, a balancing pressure bellows for opposing the rotation of said arm through said spring arrangement, a power supplied back pressure nozzle operatively connected to said balancing pressure bellows and coverable upon rotation of said arm, and means for adjusting one of said bellows along said arm to change the moment relation between said bellows with respect to said arm.

3. For use in instruments of the character described, a torque balance nozzle-baffle translation unit comprising a pivoted arm, a series of adjustment bolts spaced along said arm at one side of the pivot of said arm, a leaf spring secured to said arm adjacent said pivot and overlying said adjustment bolts, a variable condition responsive unit associated with said arm at the other side of said pivot with said unit including a variable condition responsive bellows for engagement with said arm as a means of rotating said arm and means for adjusting said bellows along said arm to change the moment relation therebetween, a balancing pressure bellows unit associated with said one side of said arm and including a pressure receiving container, a spring loaded bellows within said container, and movement transfer means connecting said balancing pressure bellows and said leaf spring with said balancing pressure unit opposing the rotation of said arm through the arrangement of said leaf spring and adjustment bolts, and a power supplied back pressure nozzle arranged in nozzle-baffle relation with said arm and connected to said balancing pressure container to deliver back pressure thereto.

4. A pneumatic computing system for deriving a dependent pneumatic pressure from a plurality of variable conditions, said system comprising a plurality of devices each operable responsively with respect to one of said variable conditions to produce a pneumatic output pressure in predetermined relation with the value of the variable condition with which it is associated, at least one of said devices being a characterized translation unit with a torque balance nozzle-baffle construction, said translation unit comprising a pivoted arm, a variable condition responsive bellows for rotating said arm, a characterizingly responsive spring arrangement on said arm, a balancing and output pressure bellows for opposing the rotation of said arm through said spring arrangement, a power supplied back pressure nozzle operatively connected to said balancing pressure bellows and coverable upon rotation of said arm, and means for adjusting one of said bellows along said arm to change the moment relation between said condition responsive bellows and said balancing pressure bellows with respect to said arm, and a torque balance nozzle-baffle combining unit pneumatically connected to the output of each of said variable condition responsive devices for receiving and ratioing the pneumatic output pressures of said devices in compensation for difference involving said characterization of said translation unit, said combining unit comprising a pivoted arm, means for balancing said arm about its pivot including a plurality of bellows for applying the output pressures of said devices to said combining unit arm and a bellows for applying a balancing pressure to said arm, a power supplied back pressure nozzle operatively connected to said combining unit balancing pressure applying bellows and coverable upon rotation of said combining unit arm, and means for adjusting one of said combining unit bellows along said combining unit arm to change the moment relation between said combining unit pressure applying bellows with respect to said combining unit arm.

References Cited in the file of this patent

UNITED STATES PATENTS

| | | |
|---|---|---|
| 2,062,110 | Swartwout | Nov. 24, 1936 |
| 2,304,783 | Donaldson | Dec. 15, 1942 |
| 2,312,201 | Thompson et al. | Feb. 23, 1943 |
| 2,436,451 | Rosenberger | Feb. 24, 1948 |
| 2,441,044 | Tate | May 4, 1948 |
| 2,444,549 | Anderson | July 6, 1948 |
| 2,481,648 | Dehn | Sept. 13, 1949 |
| 2,507,498 | Brown | May 16, 1950 |
| 2,524,749 | Baldgridge | Oct. 10, 1950 |
| 2,543,872 | Schaefer | Mar. 6, 1951 |
| 2,659,531 | Thoresen | Nov. 17, 1953 |

FOREIGN PATENTS

| | | |
|---|---|---|
| 291,841 | Great Britain | June 5, 1928 |